(12) United States Patent
Sandusky

(10) Patent No.: US 6,388,596 B1
(45) Date of Patent: May 14, 2002

(54) DIGITAL SIGNAL DEMODULATION USING WEIGHTED PEAK SAMPLE AVERAGING

(75) Inventor: Randall L. Sandusky, Divide, CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/577,910

(22) Filed: May 24, 2000

Related U.S. Application Data
(60) Provisional application No. 60/203,145, filed on May 8, 2000.

(51) Int. Cl.[7] .............................................. H03M 1/00
(52) U.S. Cl. ........................................ 341/132; 341/50
(58) Field of Search .............................. 360/51, 77.08, 360/40, 48, 131, 78.14; 341/132, 50, 59, 67, 58; 714/752, 784

(56) References Cited

U.S. PATENT DOCUMENTS

| | | | |
|---|---|---|---|
| 5,668,678 A | * 9/1997 | Reed et al. | 360/51 |
| 5,751,510 A | * 5/1998 | Smith et al. | 360/67 |
| 5,825,318 A | * 10/1998 | Patapoutian et al. | 341/131 |
| 5,854,714 A | 12/1998 | Reed et al. | |
| 5,966,258 A | * 10/1999 | Bliss | 360/46 |
| 6,002,542 A | * 12/1999 | Bruccoleri et al. | 360/77.11 |

OTHER PUBLICATIONS

"Digital Demodulator for Quad–Burst Position Error Signal" from IBM Technical Disclosure Bulletin, IBM Intellectual Property Network, 02/89, pp. 159–160.
IBM TDM Feb., 1989, pp. 156–160.

* cited by examiner

*Primary Examiner*—Peguy Jeanpierre
*Assistant Examiner*—Jean Bruner Jeanglaude
(74) *Attorney, Agent, or Firm*—W. Daniel Swayze, Jr.; W. James Brady; Frederick J. Telecky, Jr.

(57) ABSTRACT

A circuit (50) and method are presented for demodulating servo bursts (40–45) detected from a data medium (12). The circuit (50) includes an A/D converter to receive the detected servo bursts to convert the servo bursts (40–45) into digital data words at predefined sample times (48). A peak detector (52) determines respective peaks of the digital data words. A circuit (72, 74) weights the peaks of the digital data words with predefined weights, and a circuit (76) accumulates the weighted peaks. Circuits 88 and 90 detect the maximum and minimum weighted peak values, respectively, from the incoming data stream. A circuit (78) determines a sum of the weights applied to the digital data words. Circuits 96 and 98 store the weight values which correspond to the peak values detected by circuits 88 and 90, respectively, and a circuit (80) divides the accumulated weighted peaks by the sum of the weights.

26 Claims, 3 Drawing Sheets

DIGITAL SIGNAL DEMODULATION USING WEIGHTED PEAK SAMPLE AVERAGING

CROSS-REFERENCES TO RELATED APPLICATIONS

This application claims the benefit of prior filed copending provisional application Ser. No. 60/203,145, filed May 8, 2000.

BACKGROUND OF THE INVENTION

1. Field of the Invention

This invention relates to improvements in circuits and methods for digital servo signal demodulation in mass data storage devices, or the like, and more particularly to improvements in such circuits and methods using weighted peak sample averaging techniques.

2. Relevant Background

In modern computers and computer-type applications, one or more mass data storage devices may be employed. Typical mass data storage devices, often referred to as hard disk drives, CDROMs, or the like, have one or more rotating data storage disks. The data storage disks may have thereon, for example, a spinning magnetic, optical, or other media that can contain data. In such devices, data is generally recorded in certain field portions of rings or tracks that are physically located progressively radially outwardly from the center of the disk.

Preceding each data packet, usually the manufacturer of the mass data storage device records a servo section that contains, among other things, a number of servo bursts or pulses in each predefined servo section. The servo pulses enable various functions to be performed, including the alignment of the head or data transducer to the center of the data track, and the aiding of synchronizing the data decoding with the timing of the data recorded on the track, and so on.

Typically, four or six servo bursts are provided, with each burst being laterally offset by predetermined amounts from the centerline of the track with which it is associated. The bursts are written in quadrature in adjacent tracks, so that if the track is being properly followed by the head or data transducer, two bursts of equal amplitude are detected. Otherwise, the bursts will not appear of equal amplitude, and information sufficient to enable proper lateral head alignment with respect to the track can be decoded. For example, if one burst is at maximum amplitude, and the other is zero, the head is skewed to one side of the track and needs to be realigned. Thus, it is important that the burst amplitude be accurately detected in order to be able to derive proper positioning information. This process is referred to as "servo demodulation".

In the past, servo demodulation has been done in the analog domain by analog circuitry in the read channel of the mass data storage device. This has been done using a number of analog peak detectors, which have to be accurate and have to be able to respond quickly to amplitude changes, that is, have to be of high speed. Moreover, the offsets between adjacent peak detectors (i.e., peak detectors that detect the amplitudes of adjacent servo bursts) have to be well controlled. Typically, for example, if four servo bursts are required to be detected, four separate analog peak detectors are needed.

In operation, differences between adjacent servo bursts are developed. For example, a difference between burst A and burst B is generated, and if a voltage offset is present between the detector circuits, the offset contaminates the development of the difference. Consequently, critical circuit matching techniques are required to minimize the offset signal contamination.

Typically, each of the servo bursts to be detected includes a number of dibit pulses similar in waveshape to sine waves. The number of pulses is fixed depending upon the format selected by the manufacturer and generally is on the order of 4 to 10 in each servo burst. The peak values of the dibit pulses are generally detected using a capacitor that is charged by the dibit signal. In order to eliminate the possibility of detecting noise, some means is generally provided to control the maximum rate that the detecting capacitor can charge. As a result, several dibit pulses need to be processed before a peak can be detected and declared. Moreover, the analog value that is developed on the capacitor can only be held for a finite time, before it begins to decay. This can be disadvantageous.

As integrated circuit processes are becoming more and more reliant on CMOS devices, and more particularly to digital CMOS devices, bipolar transistors are becoming less available. As a consequence, it is becoming more difficult to design analog circuits in applications in which they formerly were readily available. Even if analog devices were to be provided in emerging digital CMOS processes, they currently do not perform very well.

What is needed, therefore, is a peak detector design and method that can be implemented in the digital domain to take advantage of the available digital CMOS processes. In addition, what is needed is the provision of a way to filter out noise during digital peak detection. In addition, what is needed is the provision of a way to hold the detected peak value for at least a time sufficient to perform the necessary digital processing using the detected peak value.

SUMMARY OF THE INVENTION

A servo signal is demodulated using a digital peak detector to minimize the effects of signal noise and system disturbances. The peak samples are weighted and averaged according to a novel algorithm.

One of the advantages of the circuit and method presented is the ability to filter out noise that may occur during digital peak detection.

Thus, in accordance with a broad aspect of the invention, a method is presented for demodulating servo bursts received from a rotating data medium. The method includes receiving a sampled analog data signal and converting the analog data signal into digital data words. Thus at least a plurality of digital data words represent individual cycles of a servo burst. The method also includes performing a full-wave rectification of the digital data words to represent both positive and negative burst values and determining an average of the digital data words for each burst.

According to another broad aspect of the invention, a method is presented for performing demodulation of servo bursts pre-recorded in quadrature along laterally offset locations from a centerline of a track of a rotating data medium. The method includes reading analog signals along the centerline representing the servo bursts on each side of the centerline. An analog-to-digital conversion of the analog signals is performed at predetermined sample intervals to produce digital words indicative of instantaneous magnitudes of the servo bursts. Digital peaks are determined of the digital words of the analog signals on opposite sides of the centerline from values at the predetermined sample intervals. Adjacent ones of the determined digital peaks are subtracted to determine an alignment of a head along the centerline of the track.

According to yet another broad aspect of the invention, a circuit is presented for demodulating servo bursts detected from a data medium. The circuit includes an A/D converter to receive the detected servo bursts to convert the servo bursts into digital data words at predefined sample times. A peak detector determines respective peaks of the digital data words. A circuit discriminates the digital data words to determine the largest and the smallest peak values so that they can be discarded if desired by the user. A circuit weights the peaks of the digital data words with predefined weights, and accumulates the weighted peaks. A circuit determines a sum of the weights applied to the digital data words, and a circuit divides the accumulated weighted peaks by the sum of the weights.

BRIEF DESCRIPTION OF THE DRAWINGS

The invention is illustrated in the accompanying drawings, in which.

In the various figures of the drawings, like reference numerals are used to denote like or similar parts.

DETAILED DESCRIPTION OF THE PREFERRED EMBODIMENTS

Figure 1:
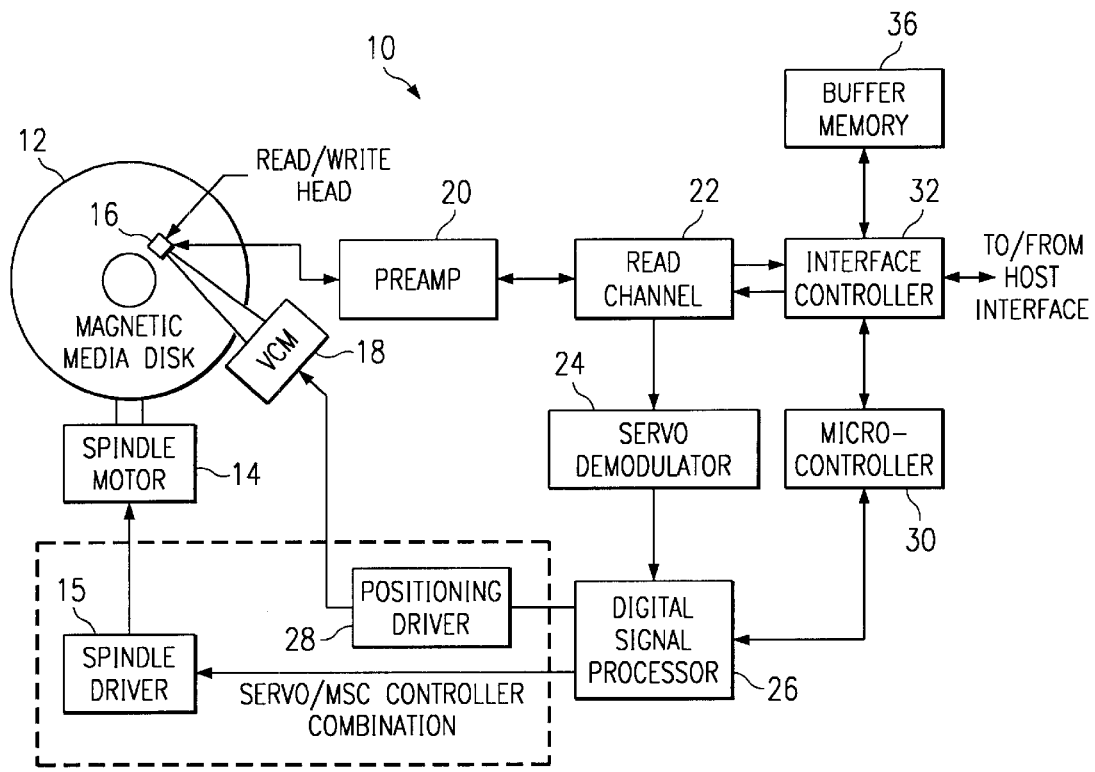
FIG. 1 is a block diagram of a generic disk drive system that represents the general environment in which the invention may be practiced.

FIG. 1 is a block diagram of a generic disk drive system 10, which represents the general environment in which the invention may be practiced. The system 10 includes a magnetic media disk that is rotated by a spindle motor 14 and spindle driver circuit 15. A data transducer or head 16 is locatable along selectable radial tracks (not shown) of the disk 12 by a voice coil motor 18. The radial tracks may contain magnetic states that contain information about the tracks, such as track identification data, location information, synchronization data, user data, and so forth. The head 16 is used both to a record user data to and read user data back from that disk 12, as well as to detect signals that identify the tracks and sectors at which data is written, and to detect servo bursts that enable the head to be properly laterally aligned with the tracks of the disk 12, as below described.

Analog electrical signals that are generated by the head 16 in response to the magnetic signals recorded on the disk 12 are preamplified by a preamplifier 20 for delivery to read channel circuitry 22. Servo signals, below described in detail, are detected and demodulated by one or more servo demodulator circuits 24 and processed by a digital signal processor (DSP) 26 to control the position of the head 16 via the positioning driver circuit 28. In the past, the servo data would that is read and processed has been analog data that has been interpreted by the DSP 26 for positioning the head 12.

A microcontroller is typically provided to control the DSP 26, as well as the interface controller 32 to enable data to be passed to and from the host interface (not shown) in known manner. A data memory 34 may be provided, if desired, to buffer data being written to and read from the disk 12.

Figure 2:
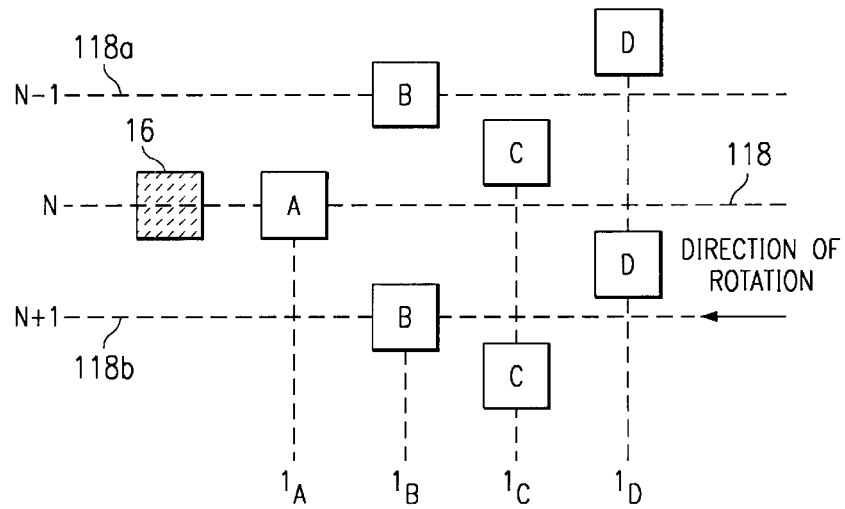
FIG. 2 is a diagram showing a typical four burst pattern in which servo burst data is written in association with each track and sector of the disk.

Servo data is written in bursts associated with each track and sector of the disk 12, one example of which being illustrated in FIG. 2. The servo burst embodiment of FIG. 2 is based upon four consecutive burst patterns A, B, C, and D that are sequentially recorded in precise lateral relationship to the tracks 118, 118a, and 118b of the disk 12. In the embodiment shown, each track has either an A burst or a B burst. Bursts C and D are recorded off center of the tracks, as shown. Each of the bursts A–D typically induces six sine wave cycles in the head 16. Each sine wave cycle is a so-called dibit pulse, positively increasing in response to the beginning of a magnetic flux change as the head traverses over a beginning interface of the first magnetic domain of the burst, and negatively increasing in response to the end of the magnetic flux change as the head traverses over the ending interface of the first magnetic domain. As each burst is three domains wide, six cycles are induced into the head as the bursts pass therebeneath.

The location of the head 16 relative to the tracks of the disk 12 is shown in phantom lines in FIG. 2. The dibit pattern of the servo bursts in the embodiment shown is arranged so that one of the bursts, for example A or B is located precisely located on a track, and that the following bursts C and D are located off-track by a precise amount. Thus, as the head 16 travels along the path of the track with which it is currently aligned, in this case, track 118, electrical signals are induced into the head by the magnetic flux of the servo bursts. The electrical signals can then be processed in the read channel 22 to determine the instantaneous position of the head 16. More particularly, if the difference in signals between those produced by servo bursts is non-zero, the head 16 is off-track. Consequently, the amount of lateral position necessary to bring the head 16 into proper track alignment can be easily made.

Figure 3:
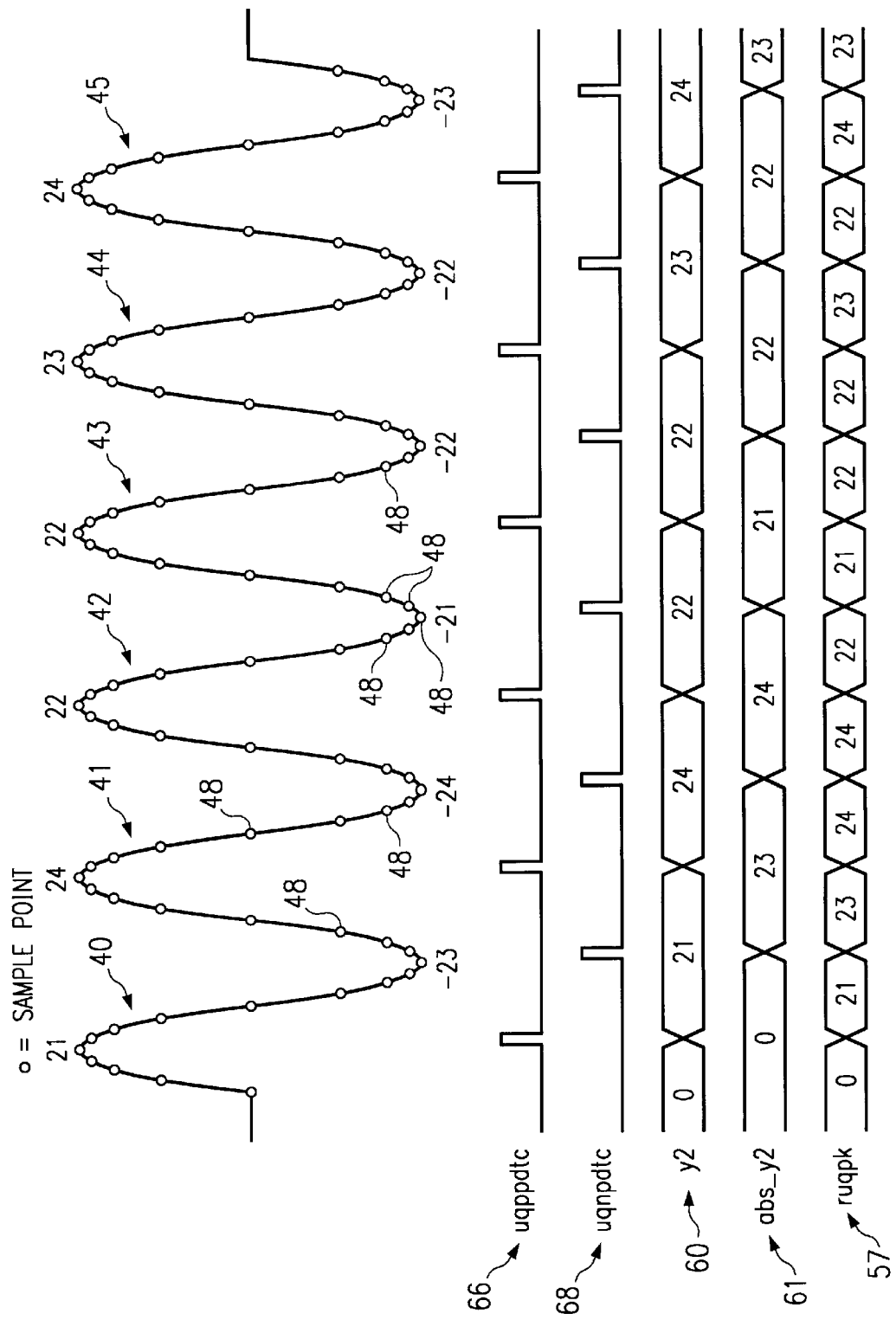
FIG. 3 shown a graph of the signals induced by the servo bursts into the head.

Briefly, the signals induced by the servo bursts into the head 16 are shown in the graph of FIG. 3. As can be seen, six complete sine wave cycles 40–45 are induced into the head 16. The sine waves are oversampled, for example, 16× oversampled, with an amplitude sample being taken at the location of each circle 48 in the waveforms. As each sample is taken, it is converted into a digital value that represents the magnitude of the waveform at the sample period. Moreover, the waveform is digitally rectified, resulting in 12 consecutive peaks that can be used as indications of peak values.

The rectified signal is then processed to detect the peaks of each of the sine waveforms. The peaks can be determined, for example, by determining the maximum value among each three sample values. The resulting data, therefore, is 12 digital values, each representing a peak value of a consecutive one of the sine waves 40–45.

According to a preferred embodiment of the invention, the peak values are weighted, preferably by a user programmable weight value. It has been found, for example, that the peak values at the start and end portions of the sine waveforms are not as reliable as the peaks in the center or middle portion of the burst. Thus, for example, the peaks determined at the beginning and end portions of the burst can be weighted less than the peaks in the center or middle of the burst.

One of the advantages that derives from the weighting technique is that the resolution of the peak detection is increased. Additionally, as mentioned, the effects of noise and other signal disturbances at the beginning and end of the burst signal can be reduced.

The weighting can be digitally implemented by multiplying each detected peak value by an appropriate weighting value. Thus, for example, the first two peaks can be multiplied by a weighting factor of 4, the next 8 multiplied by a weighting factor of 8, and the final two peaks multiplied by a weighting factor of 4. These weighting factors, of course, are merely exemplary; those skilled in the art will appreciate the various weighting patterns that may be used to weight the detected peak value for best results in the particular application being considered.

The weighted digital peak values are then discriminated to find the largest and the smallest peaks such that they can be discarded if so desired by the user. Since the peak amplitudes of the dibit pulses can be contaminated by many sources including media and electronic noise, the accuracy of the demodulation process can be improved by detecting peaks which are larger or smaller than the others as a means of indicating this contamination. These peak values can then be discarded to increase the accuracy of the demodulation process. After discrimination of the peaks then the weighted peak values can be eliminated from the burst calculations which follow.

To normalize the result, the discriminated, weighted peak values can be summed, and the sum divided by the sum of the weights applied. Thus, for instance, the value of each servo burst can be determined from:

$$BV = \frac{(peak_1 * SW_1) + (peak_2 * SW_2) + \ldots + (peak_n * SW_n)}{SW_1 + SW_2 + \ldots + SW_n} \quad \text{Equ (1)}$$

Where BV is the value of the burst, $SW_x$ is the value of the respective weights applied to the peaks, and $Peak_x$ is the value of each individual peak in a servo burst.

Figure 4:
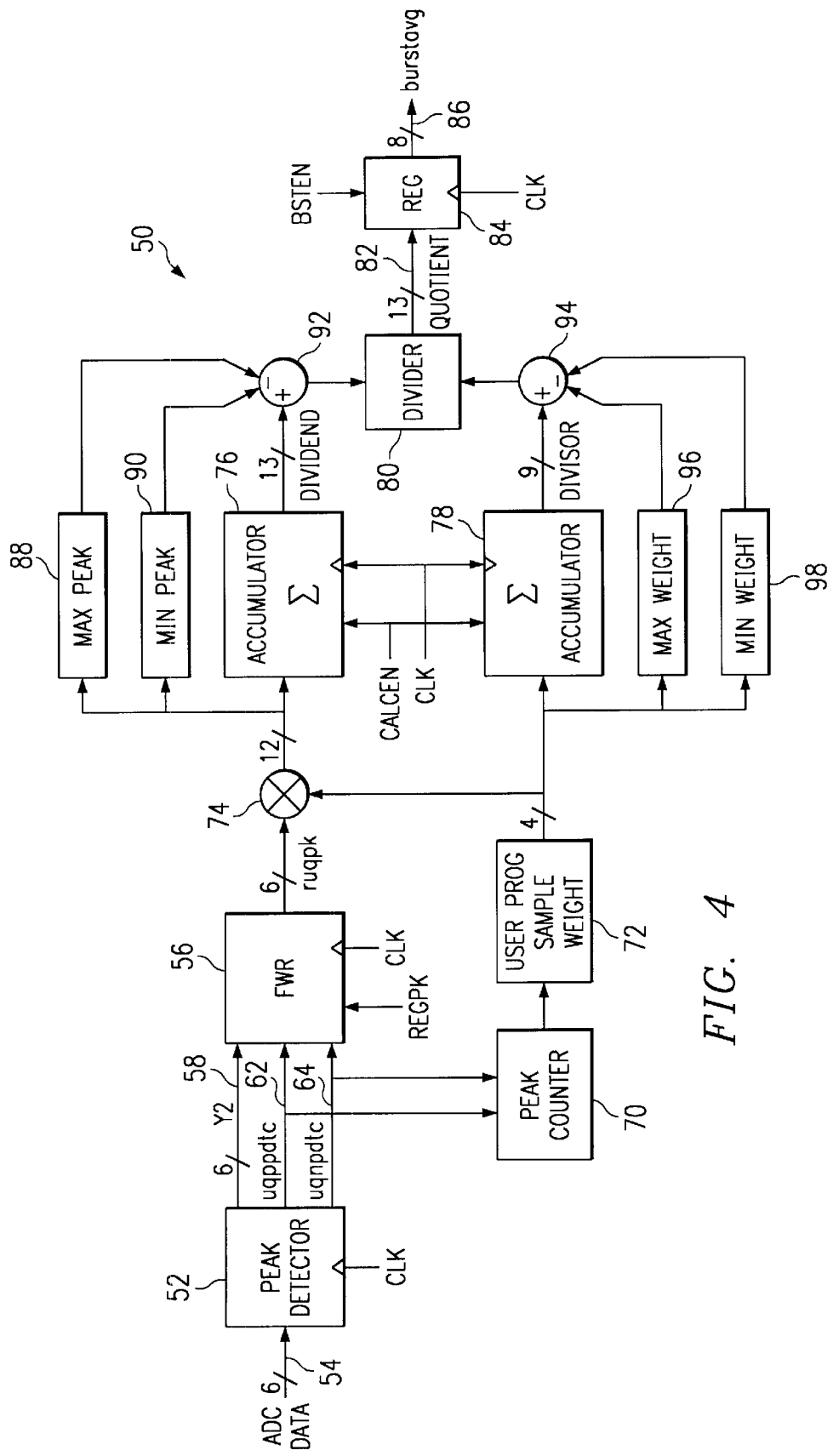
FIG. 4 is a block diagram of a digital servo demodulator circuit, in accordance with a preferred embodiment of the invention.

A block diagram of a digital servo demodulator circuit 50, according to a preferred embodiment of the invention, is shown in FIG. 4, to which reference is now additionally made. The circuit 50 includes a peak detector 52, which receives sampled digital data on an input bus 54. The digital data on the input bus 54 represents the sampled data shown by the curves 40–45 in FIG. 3, which have been digitized at the various sample periods by an A/D converter (not shown).

The output from the peak detector 52 on line 58 represents sequentially occurring digital peak values that are detected by the peak detector 52, which are applied to a register circuit FWR 56 and are denoted by the curve set 60 in FIG. 3. The absolute value of the samples is shown by the waveform set 61. At the time of occurrence of the maximum or minimum value of the respective peak registering signals are provided on lines 62 and 64, respectively labeled uqppdtc and uqnpdtc. Those are shown by the pulse streams 66 and 68 in FIG. 3. Thus, in operation, when one of the pulses on line 62 or 64 occurs, the instantaneous peak value delivered on line 58 is registered in the register FWR 56. In addition, the pulses on lines 62 and 64 are delivered to a peak counter circuit 70, as shown. The output from the register 56 is shown by the signal ruqpk, shown in FIG. 3.

In order to properly weight the successively occurring peak values delivered from the peak detector 52 to the register 56, a sample weight circuit 72 is provided. The sample weight circuit 72 is user programmable, so that the circuit user can specify the particular weight to be applied to any particular peak, the occurrence of which is determined by the peak counter circuit 70.

The output from the sample weight circuit 72 is multiplied by the value held in the register FWR 56 by a multiplier circuit 74, the output of which is accumulated in an accumulator circuit 76. At the same time, the maximum peak circuit 88 and the minimum peak circuit 90 are detecting the largest and smallest peak values, respectively, of the incoming peak data samples. These values are then subtracted from the output of accumulator 76 by subtractor 92 if this feature has been enabled by the user. If this feature is not enabled then the output of accumulator 76 will be unaltered.

In a similar manner the sample weights provided by the sample weight circuit 72 are individually accumulated in a second accumulator circuit 78, to enable the accumulated value in the accumulator 76 to be normalized. A maximum weight circuit 96 and minimum weight circuit 98 are provided to store the weight values corresponding to the peak values detected by the maximum peak circuit 88 and the minimum peak circuit 90, respectively. These weight values are then subtracted from the output of accumulator 78 by the subtractor circuit 94. Thus, the accumulated values in the accumulator 76 less the discriminated peak values are divided by the accumulated sample weight sum developed in accumulator 78 less the discriminated weight values in a divider circuit 80, to provide a quotient output on line 82 to a register 84. The output from the register 84 on line 86 represents the discriminated, weighted, normalized peak value of the servo burst that has been detected and processed by the circuit 50, as represented by equation 1 set forth about.

It will be appreciated that the circuit functions described herein can be constructed or realized through the use of software tools for integrated circuit design. Such software tools are often referred to as high-level description language (HDL) or visual high-level description language (VHDL) design tools. Such software tools can transform circuit definitions, specifications, and functions into integrated circuit hardware, without a need to specify any particular hardware implementation, layout, or design. Examples of such software tools are Verilog, which is widely available, and tool call design compilers available from Synopsys, Inc. of Mountain View, Calif.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for demodulating servo bursts received from a rotating data medium, comprising:

receiving a sampled analog data signal;

converting said analog data signal into digital data words, wherein at least a plurality of digital data words represent individual cycles of a servo burst;

performing a full-wave rectification of said digital data words to represent both positive and negative burst values;

applying different weights to said digital data words depending on a position in said cycle of said servo burst;

and determining an average of the digital data words for each burst.

2. The method of claim 1 further comprising digitally subtracting the averages of two adjacent digital data words.

3. The method of claim 1 wherein said converting said analog data signal comprises converting said analog data signal into a six bit digital word.

4. The method of claim 1 wherein each burst contains six cycles.

5. The method of claim 1 wherein said converting said analog data signal comprises oversampling said analog data signal by a ratio of about 10:1; converting at least some of said samples to digital words, each representing a magnitude of said converted samples.

6. The method of claim 1 further comprising digitally filtering noise from the digital data word.

7. The method of claim 6 wherein said filtering comprises averaging the digital words.

8. The method of claim 6 wherein said filtering comprises programmably weighting the digital words.

9. The method of claim 8 wherein said weighting comprises ascribing larger weighting values to digital words in a middle portion of a burst than digital words at the start and end portion of the burst.

10. A method for performing demodulation of servo bursts pre-recorded in quadrature along laterally offset locations from a centerline of a track of a rotating data medium, comprising:

reading analog signals along said centerline representing said servo bursts on each side of said centerline;

performing an analog-to-digital conversion of the analog signals at predetermined sample intervals to produce digital words indicative of instantaneous magnitudes of the servo bursts;

determining digital peaks of said digital words of said analog signals on opposite sides of said centerline from value s at said predetermined sample intervals;

weighing said digital peaks different than nonpeaks; and subtracting adjacent ones of said determined digital peaks to determine an alignment of a head along said centerline of said track.

11. The method of claim 10 wherein said determining digital peaks comprises determining both positive and negative peaks of said digital words.

12. The method of claim 10 wherein said performing said analog-to-digital conversion comprises sampling said analog servo bursts at said predetermined sample periods and converting said samples to digital values.

13. The method of claim 12 wherein said sampling comprises over sampling the analog signal by about 10 times.

14. The method of claim 10 wherein each burst comprises six cycles.

15. The method of claim 10 further comprising weighting said digital peak values of said digital words before said subtracting.

16. The method of claim 15 wherein said weighting comprises applying a lower than the average weight to servo bursts peak values occurring in a first portion of a servo burst cluster.

17. The method of claim 15 wherein said weighting comprises applying a larger than average weight to servo burst peak values occurring in a middle portion of a servo burst cluster.

18. The method of claim 6 wherein said weighting comprises programmably weighting said digital peak values, wherein a user can programmably select weighting values to be applied.

19. The method of claim 15 further comprising summing said digital words after said weighting.

20. The method of claim of 10 further comprising averaging said digital peaks of said digital words before said subtracting.

21. A method of claim 10 wherein said subtracting is a digital subtraction, wherein any of said values between servo burst values are eliminated.

22. A circuit for demodulating servo bursts detected from a data medium, comprising:

an A/D converter to receive said detected servo bursts to convert said servo bursts into digital data words at predefined sample times;

a peak detector for determining respective peaks of said digital data words;

a circuit for applying different weighting to said peaks of said digital data words with predefined weights than to nonpeaks of the digital data words; and accumulating said weighted peaks;

a circuit for determining a sum of said weights applied to said digital data words;

and a circuit for dividing said accumulated weighted peaks by said sum of said weights.

23. The circuit of claim 22 wherein said peak detector includes circuitry for digitally subtracting two adjacent digital data words.

24. The circuit of claim 22 wherein each burst contains six cycles.

25. The circuit of claim 22 wherein said circuit for weighting comprises a programmable circuit for weighting the digital words.

26. The circuit of claim 22 wherein said circuit for weighting comprises a circuit for ascribing larger weighting values to digital words in a middle portion of a burst than digital words at the start and end portion of a servo burst.

* * * * *